United States Patent [19]

Andersson

[11] 4,184,159
[45] Jan. 15, 1980

[54] METHOD AND INSTALLATION FOR TEMPERATURE CONTROL IN A SILO

[75] Inventor: Sven Å. Andersson, Tyringe, Sweden

[73] Assignee: Ingenjorsfirman Nils Weibull AB, Hassleholm, Sweden

[21] Appl. No.: 857,523

[22] Filed: Dec. 5, 1977

[30] Foreign Application Priority Data

Dec. 8, 1976 [SE] Sweden .................... 7613784

[51] Int. Cl.² .................................... G01S 3/02
[52] U.S. Cl. ........................ 343/112 R; 340/182; 340/207 R
[58] Field of Search ............ 343/112 R, 113 R, 6.5 R; 340/142 F, 152 T, 182, 207 R; 325/113

[56] References Cited

U.S. PATENT DOCUMENTS 3,475,742  10/1969  Whitney et al. ............... 340/207 R
3,688,292  8/1972  Snively ......................... 340/182 R
3,893,111  7/1975  Cotter ........................... 343/6.5 R Primary Examiner—Theodore M. Blum
Attorney, Agent, or Firm—Weingarten, Maxham & Schurgin

[57] ABSTRACT

The disclosure relates to a method for silage temperature control in a silo. Measurement transmitters are placed at points where it is desirable to check the temperature of the silage located in the silo. These measurement transmitters are activated, on temperature control, by means of an activation transmitter with an antenna. On activation, the measurement transmitters transmit a signal which is related to the ambient temperature, this signal being received by a receiver. If a measurement transmitter indicates a temperature deviating from a predetermined norm, it is localized by direction finding.

5 Claims, 1 Drawing Figure

U.S. Patent   Jan. 15, 1980   4,184,159
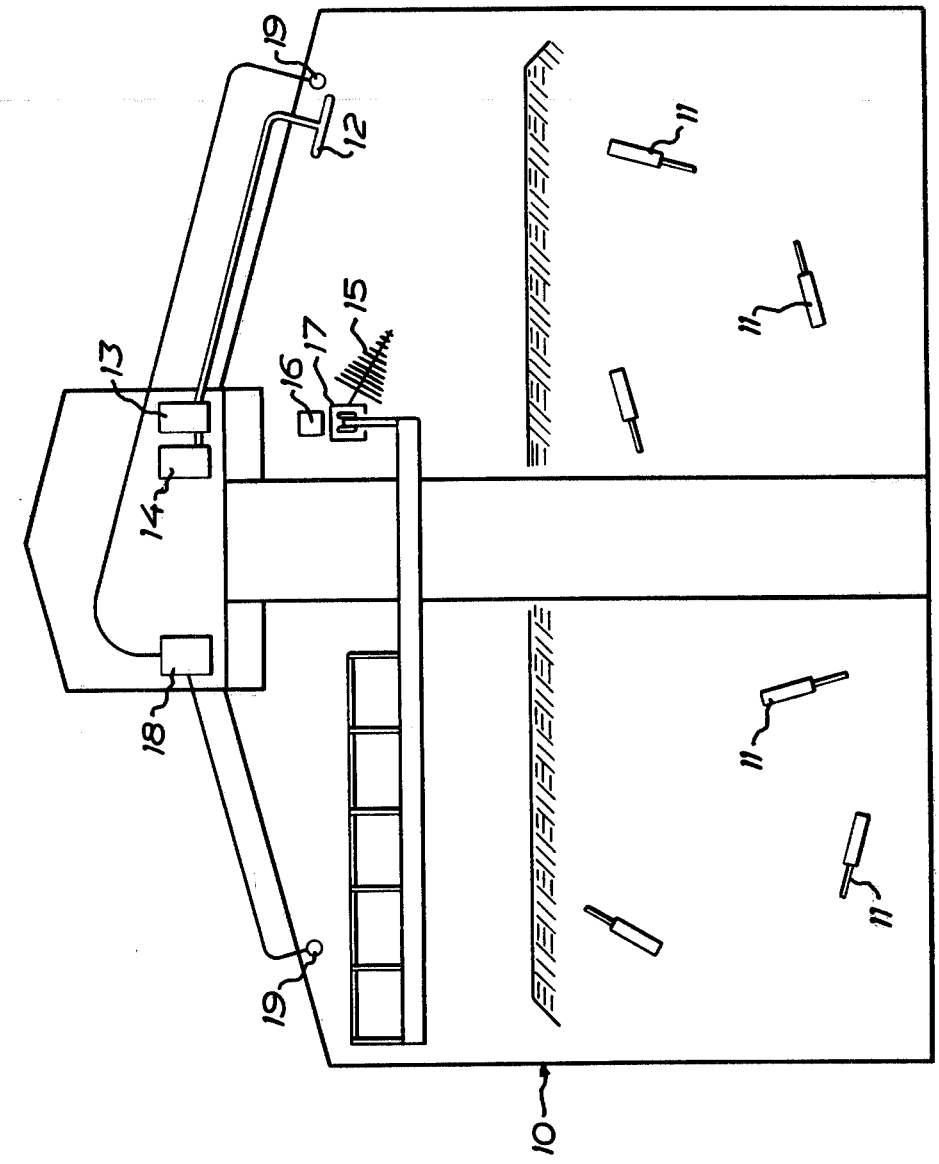

4,184,159

METHOD AND INSTALLATION FOR TEMPERATURE CONTROL IN A SILO

The present invention relates to a method for temperature control in a silo or the like, and an installation for carrying out the method.

Temperature measurement in silos is effected in that measurement devices are placed at different points in the silage and are connected to indication devices at points outside the silage mass. Connection lines are normally placed depending vertically from the roof. If use is made, for emptying the silo, of a discharge device rotating about the centre of the silo, this type of temperature measurement apparatus cannot be used. The placing of connection lines horizontally requires complicated operations on the filling of the silo and may cause great difficulties when the silo is emptied.

The object of the present invention is to obviate the above-mentioned disadvantages and to make possible a rapid placing of the measurement devices and a rapid checking of the temperature at different points in the silo.

According to the method of the present invention, the measurement transmitters of the installation are placed at suitable points for temperature control in the silage stored in the silo. Moreover, the measurement transmitters, on temperature control by means of an activation transmitter with an antenna, are activated to transmit a signal related to the ambient temperature, the signal being selectively received by a receiver. Finally, if a measurement transmitter transmits a signal which indicates a temperature deviating from a predetermined norm, this transmitter is localized by direction finding.

The present invention will now be described in greater detail with reference to the accompanying drawing which schematically illustrates one embodiment of the installation according to the present invention.

The drawing shows a partially filled silo 10 in cross-section. The silage in the silo 10 may consist of a material, for example grain, whose storage temperature must be kept within quite narrow limits. To this end, a number of measurement transmitters 11 are placed at different points in the silage, as is illustrated on the drawing. Their location is not of critical importance, but one should naturally attempt to arrive at as even a distribution as possible of the measurement transmitters 11. These measurement transmitters 11 may be of fully conventional construction with a transmitter which emits a signal of a certain frequency, the signal being modulated by a tone whose pitch is determined by a temperature sensing device. The measurement transmitters 11 do not transmit continuously but are arranged such that they are activated when they receive a certain signal and are deactivated when this signal ceases. Because of the brief transmission times, the current supply section of the measurement transmitters 11 may be of small dimensions. For activation of the measurement transmitters 11, an activation transmitter 18 with an antenna 19 is disposed in the upper region of the silo.

When temperature control is to be carried out, the activation transmitter control 18 is caused to emit a signal via its antenna 19, the signal being received by the measurement transmitters 11 which are thereby activated to transmit their own signal which is modulated in accordance with the above. The measurement transmitters 11 each transmit on their respective frequency and the transmitted signals are received by a receiver 13 with the assistance of an antenna 12. The receiver 13 is selectively adjustable at all of the frequencies on which the measurement transmitters 11 transmit, and the received signal can be impressed upon a loudspeaker such that it is possible to determine aurally whether any transmitter is transmitting a pitch which deviates from the reference pitch, in other words if the temperature deviates from the norm at any point. A register device 14 may also be coupled to the receiver 13, this register device displaying directly the temperature which the various transmitters 11 indicate. The temperature-dependent pitch frequency varies steplessly with the temperature. It will be apparent that it is possible to control the temperature rapidly even in a very large silo with, for example, a hundred transmitters, by scanning the frequency range within which the measurement transmitters 11 transmit.

If, during this scanning operation, a measurement transmitter 11 is discovered as transmitting a pitch deviating from the reference pitch which corresponds to the desired temperature, it is necessary to localize this transmitter. This is effected by means of a direction finder which consists of an adjustable antenna 15, for example of the Yagi type, which is fixed to a carriage 17 and coupled to a direction finder receiver with a field strength meter 16. On localization of the transmitter, the direction finder receiver is set at the frequency on which the measurement transmitter 11 emitting the deviating pitch is transmitting. By turning the antenna 15 and running the carriage 17, it is rapidly possible to obtain a direction to the transmitter and the exact position of the transmitter can then be obtained in the normal manner by cross-bearings. If the silo is made of sheet metal, the transmitted signal will naturally be reflected by the sheet metal walls, but the reflected signals are normally of a considerably lower field strength, for which reason it has proved in practice that it is rapidly and simply possible to localize the transmitter and thereafter take the necessary steps, for example arrange for cooling of that sector of the silo in which is located the transmitter with the deviating signal pitch.

The measurement transmitters 11 need not be provided with any current supply unit (batteries). If a sufficiently powerful signal is transmitted by means of the transmitter 18, the signal received by the measurement transmitters 11 is, namely, sufficient to be used, after conversion, for transmitting the measurement signal. Measurement transmitters of the latter type are particularly well suited for location in silage which is to be stored for a long time, for example several years. It is apparent from the drawing that an emptying device of the type suggested on the drawing with a discharge screw rotating about the central pillar of the silo is not in any way hindered by the measurement equipment. The measurement transmitters 11 are discharged together with the silage and can be easily sifted out of the silage because of their considerably greater dimensions.

What I claim and desire to secure by Letters Patent is:
1. An installation for carrying out temperature control in a silo (10), comprising;
 (a) measurement transmitters (11) which are operative, on activation, to transmit a signal related to the ambient temperature of each said transmitter (11), and are intended to be placed at suitable points for temperature control within the silage;
 (b) a transmitter (18) for activating the measurement transmitters (11);

(c) a receiver (13) for selectively receiving the signals transmitted by the measurement transmitters; and (d) a direction finder (15) for localizing each separate measurement transmitter (11) while each said measurement transmitter (11) is actuated by said transmitter (18) and is transmitting its temperature related signal.

2. The installation as recited in claim 1, wherein said direction finder (15) is coupled to a field strength meter (16).

3. The installation as recited in claim 1, wherein the output signal of the measurement transmitters is pitch-modulated with an audible pitch whose level is related to the temperature about each measurement transmitter.

4. The installation as recited in claim 1, wherein a register device (14) is provided for registering the signals transmitted by the measurement transmitters (11).

5. A method for determining the temperature at various locations in silage within a silo, said method comprising the steps of:

placing measurement transmitters at locations throughout the silage within the silo, each of said measurement transmitters being actuable by an external signal of predetermined characteristics, each of said measurement transmitters retransmitting said external signal after processing said signal by means of its temperature sensor so that at least one characteristic of the retransmitted signal is related to the ambient temperature of said measurement transmitter;

selectively actuating at least one of said measurement transmitters by means of said external signal;

indicating the ambient temperature of said at least one of said measurement transmitters through signal receiving means which receive said retransmitted signal; and selectively determining the location of a measurement transmitter by direction finding means while said measurement transmitter is actuated by an external signal and is transmitting its temperature related signal.

* * * * *